3,013,078
PROCESS FOR THE PREPARATION OF
1,5-DIBENZOYLNAPHTHALENE
Carter C. Gates, Bridgeton, N.J., assignor to E. I. du Pont de Nemours and Company, Wilmington, Del., a corporation of Delaware
No Drawing. Filed Oct. 27, 1959, Ser. No. 848,907
6 Claims. (Cl. 260—591)

This invention relates to a process for preparing 1,5-dibenzoylnaphthalene and more particularly to an improved process of preparing 1,5-dibenzoylnaphthalene in good yield and a high state of purity.

1,5-Dibenzoylnaphthalene is a vat dye intermediate in that it may be ring closed to form dibenzo[a,h]pyrene-7,14-dione and subsequently dibrominated to yield a vat dye which is described in the second edition of Colour Index under Vat Orange 1 (C.I. 59105). Heretofore 1,5-dibenzoylnaphthalene has been prepared by condensing benzoyl chloride with naphthalene in the presence of aluminum chloride followed by hydrolysis of the metal complex to liberate a crude mixture of 1,5- and 1,8-dibenzoylnaphthalenes and impurities. The 1,5-dibenzoylnaphthalene isomer is purified by solvent recrystallization techniques applied to the crude mixture. This procedure has proven to be quite expensive and it would, therefore, be highly desirable to provide a more economical process for the preparation of 1,5-dibenzoylnaphthalene in good yield and a high state of purity.

It is an object of the present invention to provide an improved process for the preparation of 1,5-dibenzoylnaphthalene. Other objects will appear hereinafter.

These and other objects of this invention are accomplished by the improvement in the process for the preparation of 1,5-dibenzoylnaphthalene from the reaction of naphthalene with benzoyl chloride in the presence of aluminum chloride, which comprises separating the aluminum chloride complex of the 1,5-dibenzoylnaphthalene isomer from the other reaction products by agitating the reaction mass, either prior to or after completion of the dibenzoylation but prior to the hydrolysis step, with at least about 4 parts per part of naphthalene employed of an organic solvent selected from the group consisting of benzene, lower alkyl homologs thereof and chloro and nitro derivatives thereof, removing the insoluble aluminum chloride complex of the 1,5-dibenzoylnaphthalene isomer from the soluble aluminum chloride complex of the 1,8-dibenzoylnaphthalene isomer and other impurities, followed by hydrolysis of the isolated aluminum chloride complex of the 1,5-dibenzoylnaphthalene isomer to form 1,5-dibenzoylnaphthalene.

As noted above the 1,5-dibenzoylnaphthalene has been prepared heretofore by reacting one mole of naphthalene with at least 2 moles of benzoyl chloride in the presence of at least 2 moles of aluminum chloride. The separation of pure 1,5-dibenzoylnaphthalene from unwanted reaction by-products, especially the 1,8-dibenzoylnaphthalene isomer, has been accomplished by solvent recrystallization techniques applied to the crude mixture of 1,5- and 1,8-dibenzoylnaphthalenes and impurities as obtained after hydrolysis of the complex. According to the present invention the 1,5-dibenzoylnaphthalene is obtained by a more direct economical procedure in that the reaction mass is diluted with an organic solvent which dissolves everything except the aluminum chloride complex of 1,5-dibenzoylnaphthalene. The insoluble aluminum chloride complex of 1,5-dibenzoylnaphthalene is then isolated by filtration and solvent washed until free of impurities. The complex is then hydrolyzed by known procedures in either acid or alkaline media to yield 1,5-dibenzoylnaphthalene which is then isolated by filtration, washed free of inorganic salts and then dried. It is believed quite unexpected that the aluminum chloride complex of 1,8-dibenzoylnaphthalene is sufficiently soluble in the class of organic solvents which are more particularly described hereinafter so that the novel process of the present invention can be economically and commercially carried out.

The necessary requirements as to the organic solvents which are used in the present invention are that the aluminum chloride complex of 1,5-dibenzoylnaphthalene be substantially insoluble therein and that the aluminum chloride complex of 1,8-dibenzoylnaphthalene and other impurities be substantially soluble therein. These organic solvents include benzene, lower alkyl homologs thereof and chloro and nitro derivatives thereof and may be represented by the formula

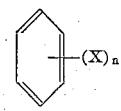

wherein X is a substituent selected from the group consisting of a lower alkyl radical, a chloro radical and a nitro radical and $n$ is an integer from 0 to 4, with the proviso that when $n$ is greater than 1 the X's need not be the same and with the further proviso that there be no more than one nitro radical present and no more than two lower alkyl radicals present. It is to be understood that mixtures of these compounds may be employed as solvents. Representative solvents include benzene, toluene, o, m and p-xylenes, chlorobenzene, the di- tri- and tetra-chlorobenzenes and nitrobenzene. For purposes of the present invention the preferred solvents are chlorobenzene, nitrobenzene, o-dichlorobenzene and trichlorobenzene. Other solvents which have been found to be satisfactory preferably in mixtures or in combination with any of the above-mentioned solvents include monochloroxylenes, o-chloronitrobenzene, o-nitrotoluene, 1,2-dichloro-4-nitrobenzene, 4- or 6-chloro-2-nitrotoluene, dichloro-p-xylene, 2,4,5-trichlorotoluene, dichloro-butylbenzenes, mixed-tetrachlorobenzenes, normal and tert-butylbenzenes and m- and p-tert-butyl-nitrobenzenes. When the solvent is employed prior to the dibenzoylation step it is necessary that it be essentially inert to benzoyl chloride. Such solvents include o-dichlorobenzene and the tri- and tetra-chlorobenzenes. If the solvent is added after the benzoylation is complete, it need not necessarily be inert to benzoyl chloride since the amount of benzoyl chloride remaining is small and will not hinder the efficiency of the separation.

Compounds which have been found to be completely unsatisfactory as solvents for purposes of the present invention include carbon disulfide, carbon tetrachloride, aliphatic hydrocarbons and their chloro or hydroxy derivatives, aliphatic ketones, n-butyl alcohol, tetrachloroethylene, polychlorinated paraffin and kerosene.

In carrying out the process of this invention the naphthalene is reacted with benzoyl chloride in the presence of aluminum chloride at a temperature of about 60° C. The reaction mass is then generally heated for a period of time at a higher temperature. These reaction steps are well-known in the art. The mass will, in general, set to a solid and will not stir below a temperature of about 60° C. unless solvent is added at this point, or is used at the beginning of the reaction. The insoluble aluminum chloride complex of 1,5-dibenzoylnaphthalene may be separated from the solvent-containing reaction mass by filtration at a temperature ranging from about 20° to 55° C. or higher. The filtration temperatures are not particularly critical, especially when the preferred solvents, such as chlorobenzene, o-dichlorobenzene and nitrobenzene, are employed.

The amount of organic solvent employed should be at least 4 parts per part of naphthalene employed in the dibenzoylation step. Since total solubility depends on both temperature and amount, as well as kind of solvent, it is clear that any amount of solvent substantially greater than the minimum required will not be preferred in view of the economics involved. Amounts of solvent up to about 9 to 10 parts per part of naphthalene have been employed without material loss in yield or quality of the desired 1,5-dibenzoylnaphthalene.

The time required for the solvent to dissolve the 1,8-isomer and impurities is not critical and may range from about 15 minutes to 3 or 4 hours. When the solvent is added after the dibenzoylation step, it is added to the hot mass and is then stirred until adjusted approximately to ambient temperature prior to filtration. Hot solvent filtrations are undesirable in practice due to fume hazards.

After the insoluble aluminum chloride complex of 1,5-dibenzoylnaphthalene is separated it may then be hydrolyzed in either alkaline or acid media to yield 1,5-dibenzoylnaphthalene. This hydrolysis may be carried out in the presence of dilute solutions of sodium hydroxide, sulfuric acid, sodium or potassium carbonate, ammonium hydroxide, calcium hydroxide, and hydrochloric, nitric, phosphoric or acetic acid. Following the hydrolysis step the pure 1,5-dibenzoylnaphthalene is then isolated. This may be accomplished by filtration or by other means such as the use of a centrifuge equipped with a suitable membrane. The procedure of settling and decantation may also be employed. The pure 1,5-dibenzoylnaphthalene, after isolation, may then be washed to free it of inorganic salts and then dried.

The following examples will better illustrate the nature of the present invention; however, the invention is not intended to be limited to these examples. Parts are by weight unless otherwise indicated.

Example 1

A mixture of 147 parts of benzoyl chloride and 209 parts of aluminum chloride was heated until a smooth melt was formed. 50 parts of naphthalene were added slowly to the melt over a period of 5 hours at a temperature of 60° C. The reaction mass was heated slowly to 70° C. and agitated at this temperature for 12 hours. 250 parts of chlorobenzene were added, and the reaction mass was allowed to cool to 30° C. The diluted mass was filtered and the filter cake was washed with chlorobenzene. The resultant filter cake was hydrolyzed, and boiled solvent free in 1000 parts of a 5% sodium hydroxide solution. The 1,5-dibenzoylnaphthalene thus liberated was filtered off, washed free of inorganic salts, and dried. A good yield of excellent quality 1,5-dibenzoylnaphthalene was obtained.

Example 2

A mixture of 137 parts of benzoyl chloride and 168 parts of aluminum chloride was heated until a smooth melt was formed. 50 parts of naphthalene were added slowly to the melt over a period of 2 to 3 hours at a temperature of 60° C. The reaction mass was heated slowly to 85°–90° C. and agitated at this temperature for 2 hours. It was then cooled to 65°–70° C. and diluted at this temperature range with 210 parts of chlorobenzene. The diluted mass was cooled to 20°–30° C., filtered and the filter cake was washed with 370 parts of chlorobenzene. The resultant filter cake was hydrolyzed and boiled solvent free in 1000 parts of a 6% sulfuric acid solution. The 1,5-dibenzoylnaphthalene thus obtained was filtered off, washed free of inorganic salts, and dried. A good yield of excellent quality 1,5-dibenzoylnaphthalene was obtained.

Example 3

Example 2 was repeated except the reaction mass was diluted with 230 parts of nitrobenzene and washed with 400 parts of nitrobenzene. A good yield of excellent quality 1,5-dibenzoylnaphthalene was obtained.

Example 4

Example 2 was repeated except that the chlorobenzene diluted reaction mass was filtered at 50° to 55° C. and and the filter cake was washed with chlorobenzene at 50° to 55° C. A good yield of excellent quality 1,5-dibenzoylnaphthalene was obtained.

Example 5

Example 2 was repeated except that the reaction mass was diluted with 210 parts of commercial chloroxylenes (boiling range 180° to 191° C., obtained by the monochlorination of the commercial mixed o, m and p-xylenes) and the filter cake of the metal complex was washed with 370 parts of chlorobenzene. The desired ketone was obtained in excellent yield and quality.

Example 6

A mixture of 192 parts of benzoyl chloride, 235 parts of aluminum chloride and 25 parts of trichlorobenzene was heated until a smooth melt was formed. 63 parts of naphthalene were added over a period of 2 to 3 hours at a temperature of 60° C. The reaction mass was heated slowly to 85° to 90° C. and agitated at this temperature for 2 hours. It was then cooled to 50° to 60° C. and diluted at this temperature range with 300 parts of chlorobenzene. The diluted mass was cooled to 20° to 30° C., filtered and the filter cake was washed with 370 parts of chlorobenzene. The resultant filter cake was hydrolyzed and boiled solvent free in 1000 parts of a 6% sulfuric acid solution. The 1,5-dibenzoylnaphthalene thus obtained was filtered off, washed free of inorganic salts, and dried. A good yield of excellent quality 1,5-dibenzoylnaphthalene was obtained.

In this example, the 25 parts of trichlorobenzene may be increased up to 325 parts without materially affecting the results. Likewise o-dichlorobenzene or tetrachlorobenzenes may be used instead of the trichlorobenzene. When less than 325 parts of one of these solvents is added at the start, the difference between the amount added and 325 parts may be added later at 50° to 60° C. as indicated by using either the same solvent as that which is employed at the beginning or by supplementing the original solvent with other operable solvents.

As many widely different embodiments of this invention may be made without departing from the spirit and scope thereof, it is to be understood that this invention is not limited to the specific embodiments thereof except as defined in the appended claims.

What is claimed is:

1. In the preparation of 1,5-dibenzoylnaphthalene by reacting naphthalene with benzoyl chloride in the presence of aluminum chloride followed by hydrolysis and isolation of the compound, the improvement comprising separating the aluminum chloride complex of the 1,5-dibenzoylnaphthalene isomer from the other reaction products by agitating the reaction mass prior to the hydrolysis step, with at least about 4 parts per part of naphthalene employed of an organic solvent of the formula

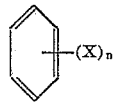

wherein X is a substituent selected from the group consisting of a lower alkyl radical, a chloro radical and a nitro radical and $n$ is an integer from 0 to 4, with the proviso that when $n$ is greater than 1 the X's need not be the same and with the further proviso that there be no more than one nitro radical present and no more than two lower alkyl radicals present, and separating the insoluble aluminum chloride complex of the 1,5-dibenzoylnaphthalene isomer from the soluble aluminum chloride complex of the 1,8-dibenzoylnaphthalene isomer and other impurities.

2. Process according to claim 1 wherein the insoluble aluminum chloride complex of the 1,5-dibenzoylnaphthalene isomer is hydrolyzed, followed by the isolation of 1,5-dibenzoylnaphthalene.

3. Process according to claim 1 wherein the organic solvent is chlorobenzene.

4. Process according to claim 1 wherein the organic solvent is nitrobenzene.

5. Process according to claim 1 wherein the organic solvent is added to the reaction mass after completion of the dibenzoylation step.

6. Process according to claim 1 wherein the organic solvent is added to the reaction mass prior to the completion of the dibenzoylation step.

References Cited in the file of this patent
UNITED STATES PATENTS 1,747,535    Wulff et al. _____ Feb. 18, 1930